(12) United States Patent
Price et al.

(10) Patent No.: US 11,397,958 B2
(45) Date of Patent: *Jul. 26, 2022

(54) STORE VISIT DATA CREATION AND MANAGEMENT

(71) Applicant: Google LLC, Mountain View, CA (US)

(72) Inventors: Thomas Price, San Francisco, CA (US); Tuna Toksoz, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/814,753

(22) Filed: Mar. 10, 2020

(65) Prior Publication Data

US 2020/0211038 A1    Jul. 2, 2020

Related U.S. Application Data

(63) Continuation of application No. 15/689,938, filed on Aug. 29, 2017, now Pat. No. 10,621,603, which is a
(Continued)

(51) Int. Cl.
*G06Q 30/02* (2012.01)

(52) U.S. Cl.
CPC ..... *G06Q 30/0204* (2013.01); *G06Q 30/0201* (2013.01)

(58) Field of Classification Search
CPC ............. G06Q 30/0204; G06Q 30/0201
See application file for complete search history.

(56) References Cited

U.S. PATENT DOCUMENTS

| 8,140,746 B2 | 3/2012 | Trichina et al. |
| 8,495,065 B2 | 7/2013 | Petersen et al. |

(Continued)

FOREIGN PATENT DOCUMENTS

| JP | 2000-259977 A | 9/2000 |
| JP | 2008-276473 A | 11/2008 |

(Continued)

OTHER PUBLICATIONS

Byoungjip et al., "AdNext: a visit-pattern mobile systems for urban commercial complexes", HotMobile '11: Proceedings of the 12th Workshop on Mobile Computing Systems and Applications, Mar. 2011, pp. 7-12 (5 pages).

(Continued)

*Primary Examiner* — Nadja N Chong Cruz
(74) *Attorney, Agent, or Firm* — Dority & Manning, P.A.

(57) ABSTRACT

A method includes receiving, at a user device, a plurality of signals pushed to the user device from a plurality of store devices located in a plurality of physical storefronts. Each signal includes a store identifier identifying the associated physical storefront. Store visit data is generated for each signal, the store visit data including the store identifiers and time data representing times associated with visits to the physical storefronts. Store visit data is aggregated for the plurality of signals pushed to the user device. Aggregated store visit data is transmitted to an analytics server configured to combine aggregated store visit data from a plurality of user devices and generate analytics data from the combined aggregated store visit data. At least a portion of the time data is removed from the aggregated store visit data before transmission to the analytics server.

20 Claims, 4 Drawing Sheets

Related U.S. Application Data continuation of application No. 14/968,356, filed on Dec. 14, 2015, now Pat. No. 10,592,913.

(56) References Cited

U.S. PATENT DOCUMENTS

| | | | |
|---|---|---|---|
| 8,639,221 B1* | 1/2014 | Zang | H04W 12/02 455/411 |
| 2002/0010629 A1 | 1/2002 | Diamond | |
| 2005/0038699 A1 | 2/2005 | Lillibridge et al. | |
| 2007/0264974 A1* | 11/2007 | Frank | H04L 63/107 455/411 |
| 2009/0224970 A1* | 9/2009 | Tsau | G06F 16/29 342/357.75 |
| 2010/0131475 A1 | 5/2010 | Kataoka et al. | |
| 2011/0047032 A1 | 2/2011 | Kumar et al. | |
| 2012/0095805 A1 | 4/2012 | Ghosh et al. | |
| 2012/0276927 A1* | 11/2012 | Pitt | H04W 12/02 455/456.2 |
| 2013/0185429 A1* | 7/2013 | Yuan | G06Q 30/02 709/225 |
| 2013/0304536 A1 | 11/2013 | Hamachi | |
| 2014/0025660 A1 | 1/2014 | Mohammed et al. | |
| 2014/0136212 A1 | 5/2014 | Kwon et al. | |
| 2014/0136312 A1* | 5/2014 | Saksena | G06Q 30/0261 705/14.39 |
| 2014/0156346 A1 | 6/2014 | Cai | |
| 2014/0164111 A1 | 6/2014 | Rodriguez et al. | |
| 2014/0249883 A1 | 9/2014 | Cicchitto et al. | |
| 2014/0282620 A1 | 9/2014 | Nuovo et al. | |
| 2014/0297363 A1 | 10/2014 | Vemana | |
| 2014/0304068 A1 | 10/2014 | Weinblatt et al. | |
| 2014/0365273 A1 | 12/2014 | Hurewitz | |
| 2015/0009915 A1 | 1/2015 | Baek et al. | |
| 2015/0038171 A1 | 2/2015 | Uilecan et al. | |
| 2015/0088612 A1 | 3/2015 | Palan et al. | |
| 2015/0130983 A1 | 5/2015 | Yamaguchi | |
| 2015/0269624 A1 | 9/2015 | Cheng et al. | |
| 2015/0304331 A1 | 10/2015 | Nakagawa et al. | |
| 2016/0063278 A1* | 3/2016 | Kraska | G06F 21/602 713/165 |
| 2016/0125467 A1 | 5/2016 | Scott et al. | |
| 2016/0321702 A1 | 11/2016 | Lerman et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

FOREIGN PATENT DOCUMENTS

| | | |
|---|---|---|
| JP | 2009-187165 A | 8/2009 |
| JP | 2014-032550 | 2/2014 |
| JP | 2014-109647 A | 6/2014 |
| JP | 2014-153828 A | 8/2014 |
| JP | 2015-033084 | 2/2015 |
| JP | 2015-057870 A | 3/2015 |
| JP | 2015-184072 | 10/2015 |
| WO | WO-2006/048511 A1 | 5/2006 |
| WO | WO-2008/142800 A1 | 11/2008 |
| WO | WO-2011/142327 A1 | 11/2011 |
| WO | WO-2015/009915 A2 | 1/2015 |
| WO | WO-2015/130983 A1 | 9/2015 |

OTHER PUBLICATIONS

Examination Report for EP Appln. Ser. No. 16867395.2 dated Oct. 14, 2020 (6 pages).
Notice of Allowance for U.S. Appl. No. 14/968,378 dated Sep. 22, 2020 (8 pages).
"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
"'Dolphin' attacks fool Amazon, Google voice assistants", BBC News, Sep. 7, 2017 (8 pages).
"Products Feed Specification", Google Merchant Center Help, Google, Inc., retrieved Mar. 18, 2013 from URL: http://www.support.google.com/merchants/bin/answer.py?hl=en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
Abrams, Brad, "Help users find, interact & re-engage with your app on the Google Assistant", Google Developers Blog, Nov. 15, 2017 (16 pages).
Albrecht, Chris, "Alexa, How Can You Be Used in Restaurants?", The Spoon, Dec. 10, 2017 (6 pages).
Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Crist, Ry, "Logitech Harmony's Alexa skill just got a whole lot better", CNET, Jul. 13, 2017 (2 pages).
Estes, Adam Clark, "Amazon's Newest Gadget Is a Tablet That's Also an Echo", Gizmodo, Sep. 19, 2017 (3 pages).
Final Office Action for U.S. Appl. No. 14/968,378 dated Feb. 13, 2019 (15 pages).
Final Office Action for U.S. Appl. No. 15/689,938 dated May 2, 2019 (23 pages).
Final Office Action for U.S. Appl. No. 14/968,356 dated Jan. 8, 2019 (37 pages).
Final Office Action for U.S. Appl. No. 14/968,378 dated Apr. 15, 2020 (15 pages).
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).
Gebhart, Andrew, "Google Home to the Amazon Echo: 'Anything you can do...'", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Google Developers, "GoogleAssistant SDK", retrieved Aug. 22, 2017 from URL: https://developers.google.com/assistant/sdk/ (4 pages).
Gurman, et al., "Apple Is Manufacturing a Siri Speaker to Outdo Google and Amazon", Bloomberg, May 31, 2017 (5 pages).

(56) References Cited

OTHER PUBLICATIONS

Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Preliminary Report on Patentability, Ch. I, for PCT Appln. Ser. No. PCT/US2016/066289 dated Jun. 19, 2018 (6 pages).
International Preliminary Report on Patentability, Ch. I, for PCT Appln. Ser. No. PCT/US2016/066320 dated Jun. 19, 2018 (7 pages).
International Search Report and Written Opinion for PCT Appln. No. PCT/US2016/066320 dated Jul. 12, 2017 (10 pages).
International Search Report and Written Opinion for PCT Appln. Ser. No. PCT/US2016/066289 dated Feb. 28, 2017 (11 pages).
Johnston, Lisa, "Amazon Whirlwind: New Echo, Plus, Spot, Connect, Fire TV Take the Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC News, May 18, 2017 (9 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 14/968,356 dated Jun. 25, 2018 (31 pages).
Non-Final Office Action for U.S. Appl. No. 15/689,938 dated Oct. 30, 2018 (27 pages).
Non-Final Office Action for U.S. Appl. No. 14/968,378 dated Jun. 6, 2018 (14 pages).
Non-Final Office Action for U.S. Appl. No. 14/968,378 dated Oct. 3, 2019 (16 pages).
Notice of Allowance for U.S. Appl. No. 14/968,356 dated Sep. 26, 2019 (9 pages).
Notice of Allowance for U.S. Appl. No. 14/968,356 dated May 8, 2019 (9 pages).
Notice of Allowance for U.S. Appl. No. 14/968,356 dated Nov. 18, 2019 (9 pages).
Notice of Allowance for U.S. Appl. No. 15/689,938 dated Dec. 4, 2019 (10 pages).
Notice of Allowance for U.S. Appl. No. 15/689,938 dated Oct. 11, 2019 (10 pages).
Notice of Allowance on U.S. Appl. No. 15/689,938 dated Jul. 31, 2019 (10 pages).
Notice of Reasons for Rejections for JP Appln. Ser. No. 2017-567731 dated Oct. 15, 2018 (9 pages).
Novet, et al., "Amazon is getting ready to bring Alexa to work", CNBC, Nov. 29, 2017 (4 pages).
Office Action for JP Appl. Ser. No. 2017-567731 dated Jan. 18, 2019 (12 pages).
Office Action for JP Appl. Ser. No. 2017-567731 dated Oct. 15, 2018 (9 pages).
Palladino, Valentina, "Garmin teamed up with Amazon to make a tiny Echo Dot for your car", ars TECHNICA, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges At 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
Willens, Max, "For publishers, Amazon Alexa holds promise but not much money (yet)", Digiday, Jul. 6, 2017 (6 pages).
First Office Action for CN Appln. Ser. No. 201680034796.X dated Feb. 3, 2021 (20 pages).
Non-Final Office Action for U.S. Appl. No. 15/906,954 dated Dec. 22, 2020 (29 pages).
Notice of Allowability for U.S. Appl. No. 14/968,378 dated Nov. 27, 2020 (2 pages).
Notice of Allowance for U.S. Appl. No. 15/906,954 dated Mar. 2, 2021 (12 pages).
Notice of Reasons for Rejection for JP Appln. Ser. No. 2019-99298 dated Jun. 22, 2020 (17 pages).

* cited by examiner

STORE VISIT DATA CREATION AND MANAGEMENT

CROSS-REFERENCE TO RELATED APPLICATIONS

This application claims the benefit of priority as a continuation under 35 U.S.C. § 120 of U.S. patent application Ser. No. 15/689,938, titled "STORE VISIT DATA CREATION AND MANAGEMENT," and filed on Aug. 29, 2017, which claims the benefit of priority as a continuation under 35 U.S.C. § 120 of U.S. patent application Ser. No. 14/968,356, titled "STORE VISIT DATA CREATION AND MANAGEMENT," and filed on Dec. 14, 2015, which is related to the subject matter of U.S. patent application Ser. No. 14/968,378, titled "PROVIDING CONTENT TO STORE VISITORS WITHOUT REQUIRING PROACTIVE INFORMATION SHARING," and filed on Dec. 14, 2015, each of which are hereby incorporated herein by reference in their entirety.

BACKGROUND

Store owners may wish to know how many visitors are coming in and out of their store and/or characteristics of the visitors. Further, store owners may wish to understand customer behavior such as their purchase rate, average time in the store, returning visitors, etc. Because smartphones often search for nearby WiFi networks, WiFi routers or other devices can be used to connect to and keep a record of smartphones that pass through the store. The information may then be used to generate analytics data that can be viewed by a store owner. However, such a setup requires additional work by the store owner (installing beacons or changing the WiFi firmware) and causes privacy issues (e.g., the MAC addresses of smartphones passing through the store are known).

SUMMARY

One illustrative implementation of the disclosure relates to a method. The method includes receiving, at a user device including one or more processors, a plurality of signals pushed to the user device from a plurality of store devices located in a plurality of physical storefronts. Each signal includes a store identifier identifying the associated physical storefront. The method further includes generating, by the user device, store visit data in response to receiving the signals. The store visit data includes the store identifiers and time data representing times associated with visits to the physical storefronts. The store visit data indicates the presence of the user device in the physical storefronts. The method further includes aggregating, by the user device, the store visit data for the plurality of signals pushed to the user device. The method further includes removing, by the user device, at least a portion of the time data from the aggregated store visit data. The method further includes determining, by the user device, whether the aggregated store visit data includes at least a threshold number of store identifiers. The method further includes, in response to determining the aggregated store visit data includes at least the threshold number of store identifiers, transmitting, by the user device, the aggregated store visit data to an analytics server. The analytics server is configured to combine the aggregated store visit data with aggregated store visit data from a plurality of other user devices, generate analytics data based on the combined aggregated store visit data, and provide the analytics data to one or more store owner devices of one or more store owners of the physical storefronts.

Another implementation relates to a system including at least one computing device operably coupled to at least one memory. The at least one computing device is configured to receive a plurality of signals pushed to the user device from a plurality of store devices located in a plurality of physical storefronts. Each signal includes a store identifier identifying the associated physical storefront. The at least one computing device is further configured to generate store visit data in response to receiving the signals. The store visit data includes the store identifiers and time data representing times associated with visits to the physical storefronts. The store visit data indicates the presence of the user device in the physical storefronts. The at least one computing device is further configured to aggregate the store visit data for the plurality of signals pushed to the user device. The at least one computing device is further configured to remove at least a portion of the time data from the aggregated store visit data. The at least one computing device is further configured to determine whether the aggregated store visit data includes at least a threshold number of store identifiers. The at least one computing device is further configured to, in response to determining the aggregated store visit data includes at least the threshold number of store identifiers, transmit the aggregated store visit data to an analytics server. The analytics server is configured to combine the aggregated store visit data with aggregated store visit data from a plurality of other user devices, generate analytics data based on the combined aggregated store visit data, and provide the analytics data to one or more store owner devices of one or more store owners of the physical storefronts.

Yet another implementation relates to one or more computer-readable storage media having instructions stored thereon that, when executed by one or more processors, cause the one or more processors to execute operations. The operations include receiving a plurality of signals pushed to the user device from a plurality of store devices located in a plurality of physical storefronts. Each signal includes a store identifier identifying the associated physical storefront. The operations further include generating store visit data in response to receiving the signals. The store visit data includes the store identifiers and time data representing times associated with visits to the physical storefronts. The store visit data indicates the presence of the user device in the physical storefronts. The operations further include aggregating the store visit data for the plurality of signals pushed to the user device. The operations further include removing at least a portion of the time data from the aggregated store visit data. The operations further include determining whether the aggregated store visit data includes at least a threshold number of store identifiers. The operations further include restricting information from the aggregated store visit data that may be used to identify the user device or a user of the user device. The restriction of the information comprises one of: removing any information that identifies the user device or the user of the user device, and associating a random device identifier with the aggregated store visit data, wherein the identity of the user device or the user of the user device cannot be determined from the random device identifier. The operations further include, in response to determining the aggregated store visit data includes at least the threshold number of store identifiers, transmitting the aggregated store visit data to an analytics server. The analytics server is configured to combine the aggregated store visit data with aggregated store visit data from a plurality of other user devices, generate analytics data based on the combined aggregated store visit data, and provide the analytics data to one or more store owner devices of one or more store owners of the physical storefronts.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
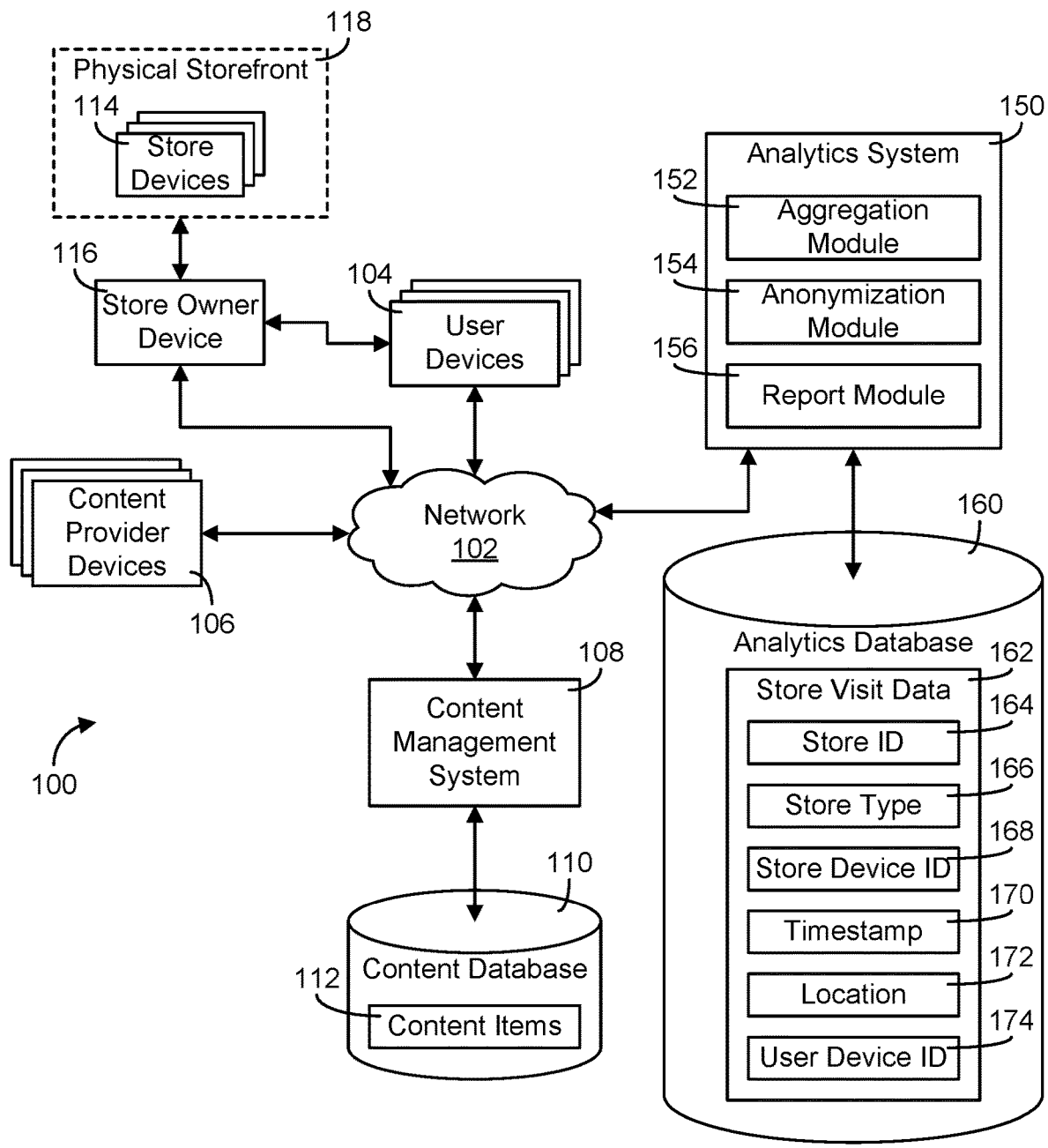
FIG. 1 is a block diagram of an analytics system and associated environment according to an illustrative implementation.

Following below are more detailed descriptions of various concepts related to, and implementations of, methods, apparatuses, and systems for providing information using a computer network. The various concepts introduced above and discussed in greater detail below may be implemented in any of numerous ways as the described concepts are not limited to any particular manner of implementation. Examples of specific implementations and applications are provided primarily for illustrative purposes.

Referring generally to the figures, various illustrative systems and methods are provided for generating and providing analytics data for a store owner while maintaining privacy for customers of the store. The systems and methods described herein allow for the collection of data from a plurality of user devices that are in the vicinity of the store, and for using the data to generate analytics for a store owner. In some implementations, the user devices may provide data to the analytics server without communicating with store devices of the store beyond receiving a pushed signal from the store devices.

In a physical storefront, one or more store devices may be deployed. The store devices may be, for example, beacons (e.g., Bluetooth beacons) or WiFi routers. In some implementations, the store may include WiFi routers that generally provide a wireless network for surrounding user devices. In the systems and methods described herein, the WiFi routers or other store devices are used to push a signal to user devices in range of the devices. The signal may include a store identifier or other information that identifies the store to the user device. The store devices may then be configured not to receive a response or other information from the user device after pushing the signal.

The user device (e.g., a smartphone), and more particularly an application on the user device, may receive the signal and create store visit data for the user device. The store visit data may generally relate to stores that the user device has visited and received a signal. For example, the store data may include store identifiers from stores that the user of the user device has visited, along with time data representing times associated with the visits. The collection of the store visit data occurs at the user device instead of via the store devices (e.g., WiFi routers), ensuring privacy between the store devices and the users. In some implementations, the only interaction between the store devices and the user device is when a store device pushes a message to the user device. In other implementations, the store devices and user device may also engage in typical WiFi communication as well.

The user device may aggregate store visit data for a plurality of signals pushed to the user device. The user device may continue to aggregate store visit data. In some implementations, the user device may aggregate store visit data until a threshold number of store identifiers is reached. For example, the user device may accumulate up to one thousand store visits or store identifiers. In response to reaching the threshold, the user device may then transmit the store visit data to an analytics server. In various implementations, the user device may transmit the store visit data upon reaching a threshold for a given time frame (e.g., one day, one week, one month, etc.), and may not transmit the store visit data if the visit threshold or time threshold is not met.

Before transmitting the store visit data, the user device may anonymize the store visit data, in some implementations. For example, the user device may remove at least a portion of the time data from the aggregated store visit data. For example, a specific time of a visit may be removed from the store visit data, and can be replaced with a date, a day of the week, a week, etc. associated with the visit. As another example, the user device may be configured to restrict information that may allow the analytics server to identify the user device. In some implementations, a random user device identifier may be transmitted with the store visit data, preventing the analytics server from identifying the user device but allowing the analytics server to detect repeated visits by the user at a store (based on the random user device identifier). In other implementations, a user device identifier may be restricted from the analytics server completely.

The analytics server may receive store visit data from a plurality of user devices. When the analytics server receives a request for analytics data from a store owner, the analytics server may aggregate store visit data relating to the store owner. For example, the store owner may provide an identifier for the store devices (e.g., a MAC address) pushing messages to the user devices, which may be used to identify relevant store visit data. The aggregated store visit data may then be provided to the store owner. In some implementations, the analytics server may further anonymize the store visit data in any way.

The systems and methods described herein allow for reduced setup from the store owner to facilitate the process. For example, in some implementations, instead of the store owner installing beacons or providing special setup for the WiFi routers (to cause the store devices to detect user devices and collect information from the user devices), the store devices may simply push a signal to the user devices (e.g., from existing WiFi routers). The user devices and analytics server may then be used to carry out the systems and methods described herein.

For situations in which the systems discussed herein collect and/or utilize personal information about users, or may make use of personal information, the users may be provided with an opportunity to control whether programs or features may collect personal information (e.g., information about a user's social network, social actions or activities, a user's preferences, a user's current location, etc.), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users. The use of user information by the systems and methods herein are described in greater detail below.

Referring now to FIG. 1, and in brief overview, a block diagram of an analytics system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an Internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content items from which content management system 108 selects may be provided by one or more content providers via network 102 using one or more content provider devices 106.

Environment 100 is shown to include a physical storefront 118 (e.g., a store). When a user of user device 104 is visiting physical storefront 118 (e.g., when a user is visiting a store), the user device may be near one or more store devices 114 installed within or near the physical storefront. When near a store device 114, user devices 104 may receive a signal from the store device. Store devices 114 may generally be configured to push signals to user devices 104. Further, store devices 114 may generally facilitate wireless communication between devices in physical storefront 118. For example, store devices 114 may be WiFi routers that can be used to create a local wireless network allowing devices within physical storefront 118 to communicate with one another or with a remote source. As another example, store devices 114 may be or serve as beacons transmitting signals to nearby devices (e.g., without the capability to receive signals from other devices), such as Bluetooth beacons. Environment 100 is further shown to include a store owner device 116 for a store owner of physical storefront 118 (or administrator or other user associated with the store). Store owner device 116 may also connect to the other devices and systems over network 102.

An analytics system 150 may be configured to receive information from one or more user devices 104 or store owner devices 116. Analytics system 150 may, for example, aggregate and anonymize information from the one or more user devices, and use the information to provide analytic information for content provider devices 106 or store owner devices 114. Analytics system 150 may store analytics information in an analytics database 160, in some implementations.

Referring in greater detail to FIG. 1, user devices 104, content provider devices 106 and/or store owner devices 116 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104, content provider devices 106 and/or store owner devices 116 may be configured to receive data from various sources using a network 102. In some implementations, network 102 may include a computing network (e.g., LAN, WAN, Internet, etc.) to which the devices may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Referring further to FIG. 1, the activities of analytics system 150 is described in further detail. Analytics system 150 may receive and analyze data from user devices 104, content provider devices 106, store owner device 116, and various other sources via network 102 and provide analytics information for the content provider devices and store owner devices relating to user activity. Analytics system 150 may include one or more processors (e.g., any general purpose or special purpose processor), and may include and/or be operably coupled to one or more memories (e.g., any computer-readable storage media, such as a magnetic storage, optical storage, flash storage, RAM, etc.). In various implementations, analytics system 150 may be implemented as a separate system or may be integrated with another system within environment 100 (e.g., content management system 108). While analytics system 150 is described as a system receiving information from a plurality of devices, in some implementations of the present disclosure, analytics system 150 may not receive any information from user devices 104.

Analytics system 150 may include one or more modules (e.g., implemented as computer-readable instructions executable by a processor) configured to perform various functions. Analytics system 150 includes an aggregation module 152 configured to aggregate store visit data from multiple user devices 104. An individual user device 104 may receive or generate store visit data relating to one or more store visits by a user, and may transmit the store visit data to analytics system 150. Aggregation module 152 may receive store visit data from multiple user devices 104. The store visit data may include, for example, a store identifier (e.g., an identifier for the physical storefront at which the user device received a signal), a timestamp (or other information that indicates when the user visited the physical storefront), a store device identifier (e.g., an identifier of a particular store device that transmitted the signal to the user device) and other information relating to user activity, user device activity, or other activity at the physical storefront. In some implementations, some or all of the store visit data may be anonymized by user device 104 before transmission to analytics system 150. Aggregation module 152 may store the received store visit data in analytics database 160. The stored data may then be used to generate analytics data for a store owner or other user.

Analytics system 150 may include an anonymization module 154 configured to anonymize the store visit data. Anonymization module 154 may anonymize the store data in any way. For example, part or all of a store identifier (e.g., a name of a specific store) may be removed from the store visit data, so that a data provided by analytics system 150 to a store owner does not reveal specific physical storefronts from which the store visit data originated (e.g., only reveals aggregate information across multiple storefronts). As another example, the type of store (e.g., restaurant, grocery store, clothing store, electronics store, etc.) may be removed from the store visit data, so that analytics system 150 does not report to the store owner the particular shopping habits of user devices associated with the store visit data. As another example, location data (e.g., geo-location) may be removed from the store visit data, such that analytics system 150 does not identify specific locations associated with the store visit data (e.g., only location generalized to a larger geographic area, only data aggregated for all analyzed storefronts of the store owner, etc.). Anonymization module 154 may be configured to wholly or partially anonymize the store visit data (e.g., either completely removing location information or generalizing the location information to a single city or state). Anonymization module 154 may anonymize store visit data as the data is received from user devices 104, or may anonymize store visit data already stored in analytics database 160. For example, anonymization module 154 may anonymize store visit data upon receiving a request for the store visit data from a store owner device 116.

As described above, in addition to or instead of anonymization module 154 anonymizing data, user devices 104 may be configured to anonymize the store visit data before transmitting the data to analytics system 150. For example, user devices 104 may anonymize any aspect of the store visit data that the user does not wish to share with analytics system 150.

Analytics system 150 includes a report module 156 configured to generate analytics information for store owner device 116. In some implementations, when a store owner wishes to view analytics data relating to his or her store, store owner device 116 may transmit information to report module 156. The information may include a store identifier or other identifier that identifies store owner device 116 to report module 156. For example, the information may include one or more device identifiers for one or more store devices 114. The device identifiers identify one or more store devices 114 that are configured to transmit signals to user devices 104, allowing user devices 104 to generate store visit data. Using the device identifiers, report module 156 may identify store visit data relating to the store (e.g., by matching the device identifiers with store device identifiers stored within the store visit data). The matching store visit data may then be aggregated (and anonymized by module 154 if necessary) and provided to store owner device 116. The aggregated data generally indicates to the store owner how many user devices received a signal from the identified store device, and may also include other data stored within the store visit data (if the user devices provided additional information). The report may be provided to store owner device 116 in any format (e.g., webpage, spreadsheet, or any other type of file or format).

Analytics database 160, as described above, may receive store visit data 162 from analytics system 150. Store visit data 162 may include a store identifier 164 (e.g., a name of the store or other identifier that identifies a specific store and store location). Store visit data 162 may include a store type 166. For example, the store may be a retail store, restaurant, grocery store, electronics store, etc. Store type 166 may be of any granularity (e.g., the store type may be simply be "restaurant" or further identify the type of food at the restaurant). Store visit data 162 may include a store device identifier 168. Store device identifier 168 identifies a particular device within the physical storefront that transmitted the signal to the user device that triggered the process of creating store visit data. Store visit data 162 further includes a timestamp 170 that identifies a time at which the store visit data was created. Timestamp 170 may indicate a specific time, a specific day, a time of day, or any other period of time. Store visit data 162 may further include location 172. Location 172 may identify a specific location of the store (e.g., an address of the physical storefront) or a more general location (e.g., a city, state, or other region at which the physical storefront is located). Store visit data 162 may further include user device identifier 174. User device identifier 174 may be used to identify a user device 104 from which the store visit data originated. User device identifier 174 may be a random identifier chosen by user device 104, allowing analytics system 150 to identify all store visit data coming from a particular user device without being able to identify information about the user device.

In various implementations of the present disclosure, store visit data is stored in analytics database 160. In various implementations, the data may be retrieved from any source or combination of sources, or may not be stored and is only used when the data is received from user devices 104. Further, the data may be stored in any format within analytics database 160 or any other data storage device. Analytics database 160 is provided as an example data storage by way of example only.

Figure 2:
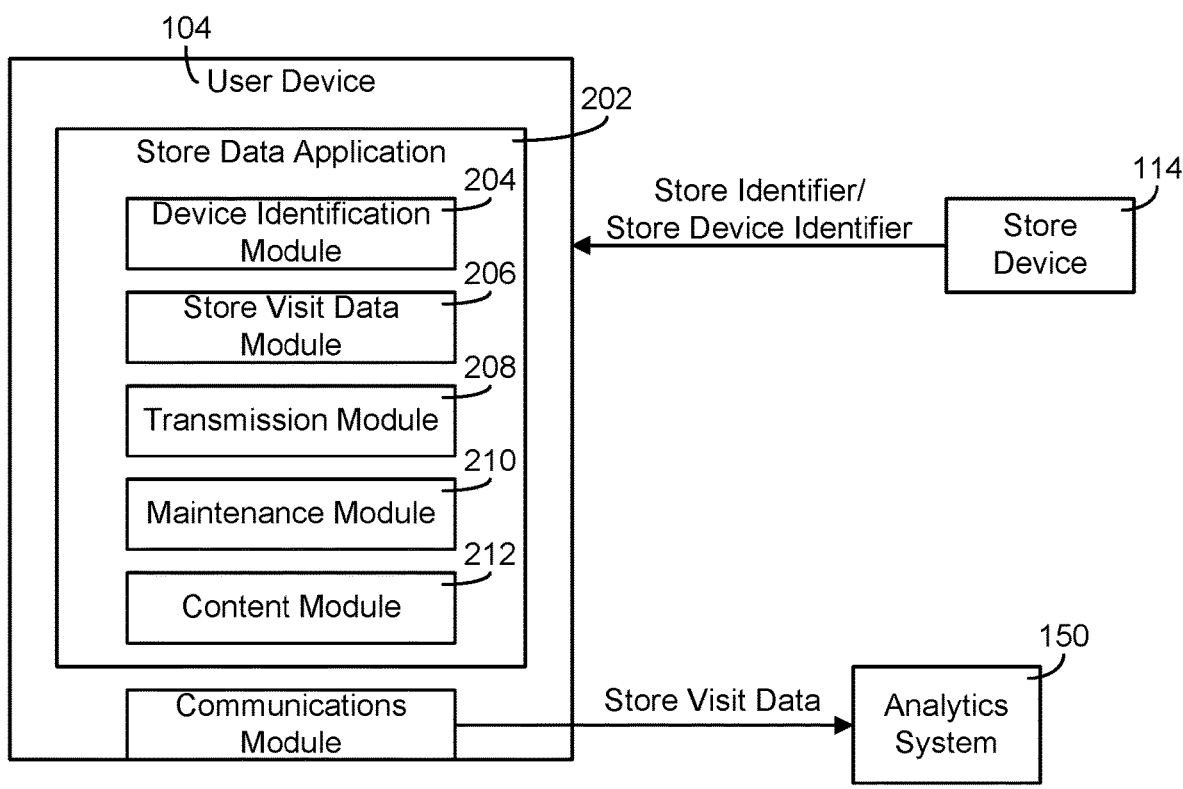
FIG. 2 is a block diagram of a store data application of the user device of FIG. 1 according to an illustrative implementation.

Referring now to FIG. 2, the activities of a user device 104 is described in greater detail. As described above, user device 104 may include an application configured to generate store visit data, to store and maintain the data, and to transmit the data to an analytics system 150.

User device 104 may generate store visit data when in the presence of one or more store devices 114 in a physical storefront 118 that are configured to transmit signals to the user device. A physical storefront may include one or more store devices 114 located in various locations, configured to provide various wireless network features for devices in the area. For example, store devices 114 may include WiFi routers configured to provide access to a wireless network to one or more devices. As another example, store devices 114 may include one or more beacons configured to transmit low energy signals to one or more devices. Store devices 114 may be any type of device configured for wireless communications with other devices and may be located in various locations in physical storefront 118 to provide wireless network coverage for part or all of the area.

In some implementations, store devices 114 may be configured to push a signal to one or more user devices 104. The signal may include an identifier, such as a store identifier (identifying the particular store the user device is at) or a store device identifier (e.g., a MAC address or other identifier that specifically identifies a store device). A user device 104 may receive the transmitted signal including the identifier. Store devices 114, may be configured not to have further communication with user devices 104. For example, store devices 114 may push the signals to the one or more user devices, and the user devices may use the information from the signal without any communication back to the store devices. In other words, store devices 114 may push information to user devices 104 without the need to receive any feedback or further information from user devices 104.

User device 104 is shown to include a store data application 202 configured to receive, generate, and maintain store visit data. For example, store data application 202 may receive a signal from a store device 114, extract a store identifier or store device identifier from the signal, store the identifier as part of store visit data, and transmit the store visit data to a remote server (e.g., analytics system 150). Store data application 202 includes an device identification module 204 configured to extract identification information from a received signal. For example, when user device 104 receives a pushed signal from a store device 114, device identification module 204 may determine identification information of the device and/or the store from which the signal was transmitted. The identification information may include, for example, a MAC address of a WiFi router, a beacon identifier, a store name or other identifier, etc.

Store data application 202 includes a store visit data module 206 configured to generate store visit data upon receiving the signal from a store device 114. The store visit data generated may include the store identifier or store device identifier extracted by identification module 204. Such information may further include information about the type of store. The store visit data may further include the current location of user device 104. For example, store data application 202 may retrieve a geolocation or other location information from a GPS or other navigation or location application on user device 104. The store visit data may further include the current time or date at which the signal was received by user device 104. The store visit data may further include any information relating to current user or user device behavior while the user device is in the presence of physical storefront 118 and/or store devices 114.

In some implementations, store visit data module 206 may anonymize the store visit data. For example, one or more of a store identifier, store device identifier, the type of store, a timestamp, or a location may be anonymized before storing the store visit data. Anonymizing the store visit data allows the user and user device not to be identified by an analytics system 150 if or when store visit data is transmitted to the analytics system.

Store data application 202 includes a transmission module 208 configured to facilitate the transmission of store visit data to a remote server (e.g., analytics system 150). In some implementations, user device 104 may be configured to periodically transmit store visit data (e.g., once a day, once a week, etc.) to analytics system 150. In some implementations, user device 104 may transmit store visit data to analytics system 150 based on the amount of store visit data generated at the user device. For example, transmission module 208 may wait until a threshold amount of locations (e.g., one thousand locations) have been visited (with store visit data being generated for each visit), or a threshold amount of visits have occurred, before sending the store visit data to analytics system 150. In some implementations, before transmitting the store visit data, some or all of the store visit data may be anonymized by store visit data module 206. For example, once one thousand locations have been visited and a transmission is initiated, store visit data module 206 may scrub all timestamp information from the data before transmission to analytics system 150.

In some implementations, user device 104 may be configured not to share store visit data with some or all devices, and may not include a transmission module 208. For example, user device 104 may be configured not to share store visit data with any other device, and may only use the store visit data to determine which content items to display on the user device. As another example, user device 104 may be configured to only share the store visit data with a remote server such as analytics system 150. User device 104 may be configured not to ever share store visit data with store devices 114, in some implementations.

Store data application 202 may include a maintenance module 210 configured to maintain store visit data in memory of user device 104. For example, a user may choose to "opt out" of receiving signals from a store device 114 (e.g., from a store device for a particular physical storefront, or from all physical storefronts). Maintenance module 210 may be configured to erase all store visit data stored on user device 104 in such a scenario. As another example, maintenance module 210 may be configured to erase "old" store visit data (e.g., store visit date created longer than a threshold date and time ago, such as store visit data over a year old). Store data application 202 may include a content module 212.

While store data application 202 is described as an application for a mobile device for carrying out the activities described in the present disclosure, it should be understood that such activities may be carried out by another component of the operating system of the mobile device, and the description of the application on the mobile device is not limiting.

Figure 3:
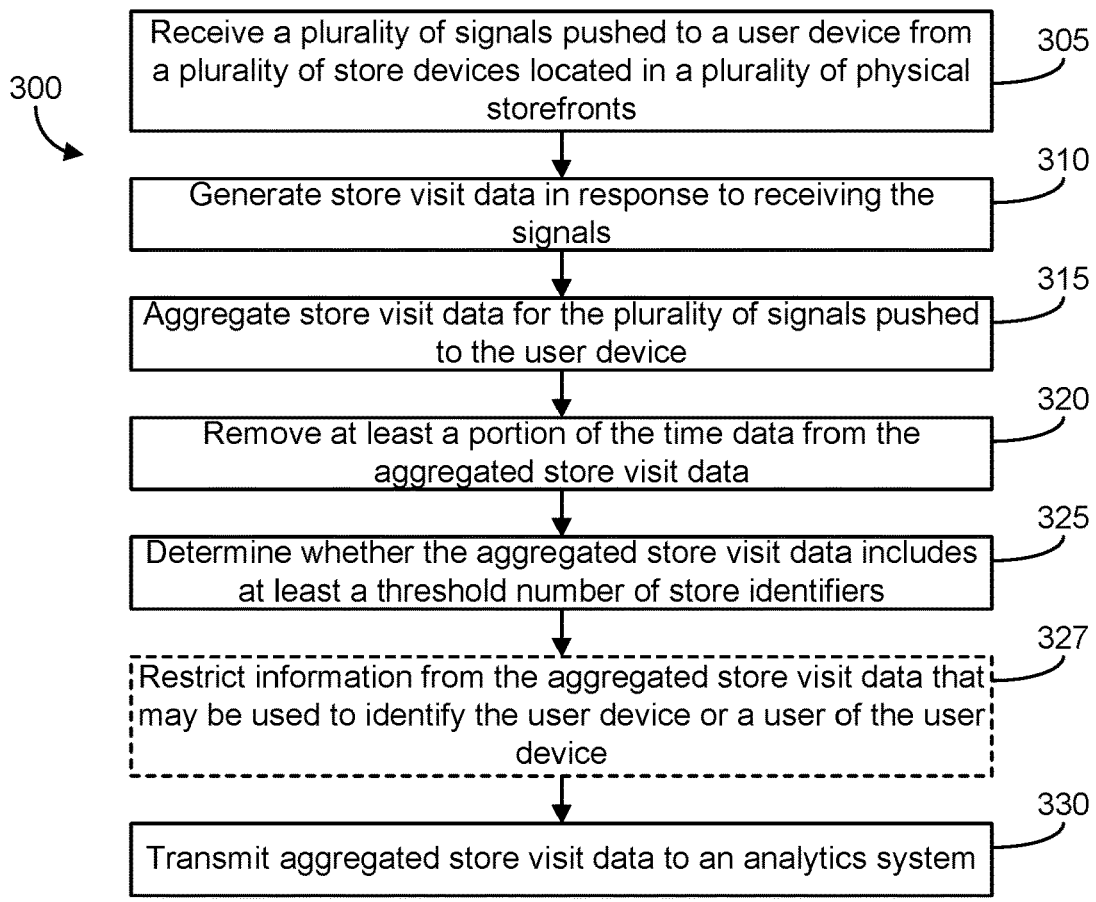
FIG. 3 is a flow diagram of a process for generating store visit data according to an illustrative implementation.

Referring now to FIG. 3, a flow diagram of a process 300 for generating store visit data is shown according to an illustrative implementation. Process 300 may be executed by, for example, user device 104 and more particularly store data application 202 as described with reference to FIGS. 1-2. Process 300 may be executed when the user device (and user of the user device) is present at a physical storefront including a plurality of store devices configured to push signals to the user devices.

Process 300 includes receiving a plurality of signals pushed to the user device from the plurality of store devices located in a plurality of physical storefronts (305). In some implementations, store devices may include WiFi routers. In addition to providing wireless communications to the physical storefront, WiFi routers may be configured to push signals to the user device. In other implementations, store devices may include beacons configured to push signals to the user device.

The signals pushed to the user device may include one or more identifiers. For example, if the store device is a WiFi router, the signal may include a MAC address or other identifier that identifies the specific WiFi router that pushed the signal. As another example, if the store device is a beacon, the signal may include a beacon identifier of the beacon that pushed the signal. The identifier may further include, for example, a store identifier (e.g., store name). The signal may further include any information that allows a remote server to identify the origin of the signal (and therefore, the location of the user device).

Process 300 further includes generating store visit data in response to receiving the signals (310). The store visit data may generally include the store identifier (and other information stored by the signal) and time data. The time data may represent a time associated with a user device visit at the physical storefront. The store visit data may further include any other data relating to the current visit of the user device at the physical storefront (either inferred by the user device or received via the pushed signal). For example, the type of store may be stored as store visit data, and may be determined either on information received from the signal or inferred from the store identifier.

Process 300 further includes aggregating store visit data for the plurality of signals pushed to the user device (315). Referring generally to process 300, the collection of signals and creation of store visit data may occur over a long period of time (e.g., one day, one month, one year, etc.). The user device may receive a plurality of signals from a plurality of store devices in a plurality of physical storefronts over the period of time.

Process 300 further includes removing at least a portion of the time data from the aggregated store visit data (320). In some implementations, the user device may wish to at least partially anonymize store visit data from a remote server that will receive the data. In one implementation, some or all of the time data may be removed for the store visit data for each visit. For example, a specific date and time can be removed, leaving just a specific date, a specific week or month, a day of the week, or another generic time period, preventing any other system from determining when the user device created the store visit data for a particular visit.

Process 300 further includes determining whether the aggregated store visit data includes at least a threshold number of store identifiers (325). In one implementation, the threshold may be representative of a total number of user device visits at physical storefronts, or a threshold number of storefronts visited. For example, the threshold may be on thousand unique store visits. In another implementation, the threshold may be representative of a number of store visits over a period of time (e.g., five visits in one week, one hundred visits in one year, etc.). In some implementations, process 300 may not include checking for a threshold number of store identifiers and may skip block 325 (and continue with the transmission of store visit data as described in block 330).

Process 300 optionally includes restricting information from the aggregated store visit data that may be used to identify the user device or a user of the user device (327). For example, any information that identifies the user device (e.g., a device type, a phone number, etc.) or the user of the user device (e.g., name, user ID, etc.) may be removed from the aggregated store visit data. In some implementations, a random device identifier may be associated with the aggregated store visit data. The random device identifier may not include any information about the identity of the user device or user.

Process 300 further includes, in response to determining the aggregated store visit data includes at least the threshold number of store identifiers, transmitting the aggregated store visit data to an analytics system (330). The analytics system may then use the aggregated store visit data to generate analytics data for a store owner as described in FIG. 4.

Process 300 may further include, when transmitting the aggregated store visit data, also transmitting a device identifier, a random device identifier, or no device identifier to the analytics system. The device identifier may allow the analytics server to identify the origin of a particular store visit data, since the analytics server is configured to receive store visit data from a plurality of user devices. In some implementations, the user device may transmit a standard user device identifier, allowing the analytics server to associate store visit data with a particular user device. The analytics server may anonymize the user device identifier before providing store visit data to a store owner.

In some implementations, the user device may transmit a random user device identifier to the analytics system with the store visit data. The random user device identifier may be a randomly chosen/assigned identifier that is stored by the analytics system. The random user device identifier may not allow the analytics server to identify the user device from which the store visit data came. However, the random user device identifier may be stored by the analytics system, and may be used again by the user device during a subsequent transmission of store visit data. This may allow the analytics server to identify store visit data that belongs to the same user device while keeping the analytics server from identifying the actual user device. This may help the analytics server, for example, identify repeat visitors at a physical storefront.

In some implementations, the user device may not transmit a user device identifier, and the analytics server may not store any user device information with the received store visit data. However, this may prevent the analytics server from identifying repeat visitors to a physical storefront.

Figure 4:
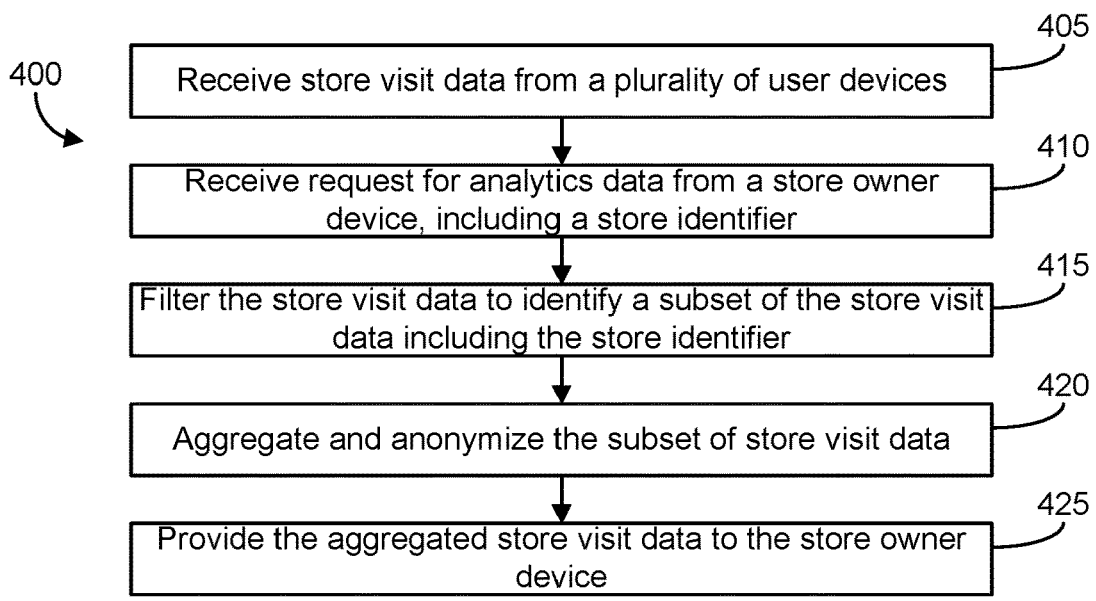
FIG. 4 is a flow diagram of a process for generating analytics data for a store owner according to an illustrative implementations.

Referring now to FIG. 4, a flow diagram of a process 400 for generating analytics data for a store owner is shown according to an illustrative implementations. Process 400 may be executed by, for example, analytics system 150 as described with reference to FIGS. 1-2.

Process 400 includes receiving store visit data from a plurality of user devices (405). The store visit data may include aggregated store visit data for a user device. For example, the user device may aggregate store visit data from one thousand visits and transmit the store visit data to the analytics system. The store visit data may include a store identifier for each visit, the store identifier indicating the presence of the user device at a physical storefront.

Process 400 further includes receiving a request for analytics data from a store owner device (410). The request may include a store identifier that identifies the store for which analytics data is requested. For example, the identifier may include a store identifier associated with the store. As another example, the identifier may include one or more store device identifiers that identify a specific device (e.g., router, beacon) within the store. The request may further include any parameters (e.g., date/time parameters, visitor parameters, etc.) that may be used to customize the analytics data for the store owner device.

Process 400 further includes filtering the store visit data to identify a subset of the store visit data including the store identifier (415). In some implementations, the analytics system may retrieve all store visit data which includes the store identifier. In some implementations, the analytics system may retrieve all store visit data for which a store device identifier matches a store device identifier from the store owner device request. Filtering the store visit data may further include filtering the data by date/time or by any other property associated with the store visit data.

Process 400 further includes aggregating and anonymizing the subset of store visit data (420). The store visit data is aggregated and anonymized such that information specific to an individual visit or an individual user device cannot be ascertained from the store visit data. For example, specific timestamps associated with the store visit data may be anonymized. As another example, any device identifier or random device identifier associated with the store visit data may be removed. In some implementations, the activities of block 420 may include maintaining user characteristics (e.g., average age, gender characteristics, interests data, etc.) in the store visit data, allowing the analytics system to aggregate the user characteristics.

Process 400 further includes providing the aggregated store visit data to the store owner device (425). The aggregated store visit data may be provided to the store visit data in any format. The aggregated store visit data may be provided to the store owner device such that the store owner device is not capable of viewing any information specific to an individual store visit or individual user device. However, the store owner may still view aggregated characteristics about the user as part of the store data.

In some implementations, process 400 may be executed in response to a store owner request, which may include or be associated with a store device identifier. Upon receiving a request, the analytics system may be configured to filter all store visit data which shares the same store device identifier with the request. This allows the store owner to view store visit data for all user devices which received a signal from a particular device. In other implementations, if the store owner request includes a store identifier, the store owner may then receive store visit data for all user devices that received a signal from any device in the physical storefront. The store owner may be able to configure his or her request to determine how many visitors the store had for a given time period, how many visitors visited a particular section of the store, and may generally receive any type of customized information. The store owner may receive such store visit data without ever finding out any information about the visitors and user devices generating the store visit data.

Figure 5:
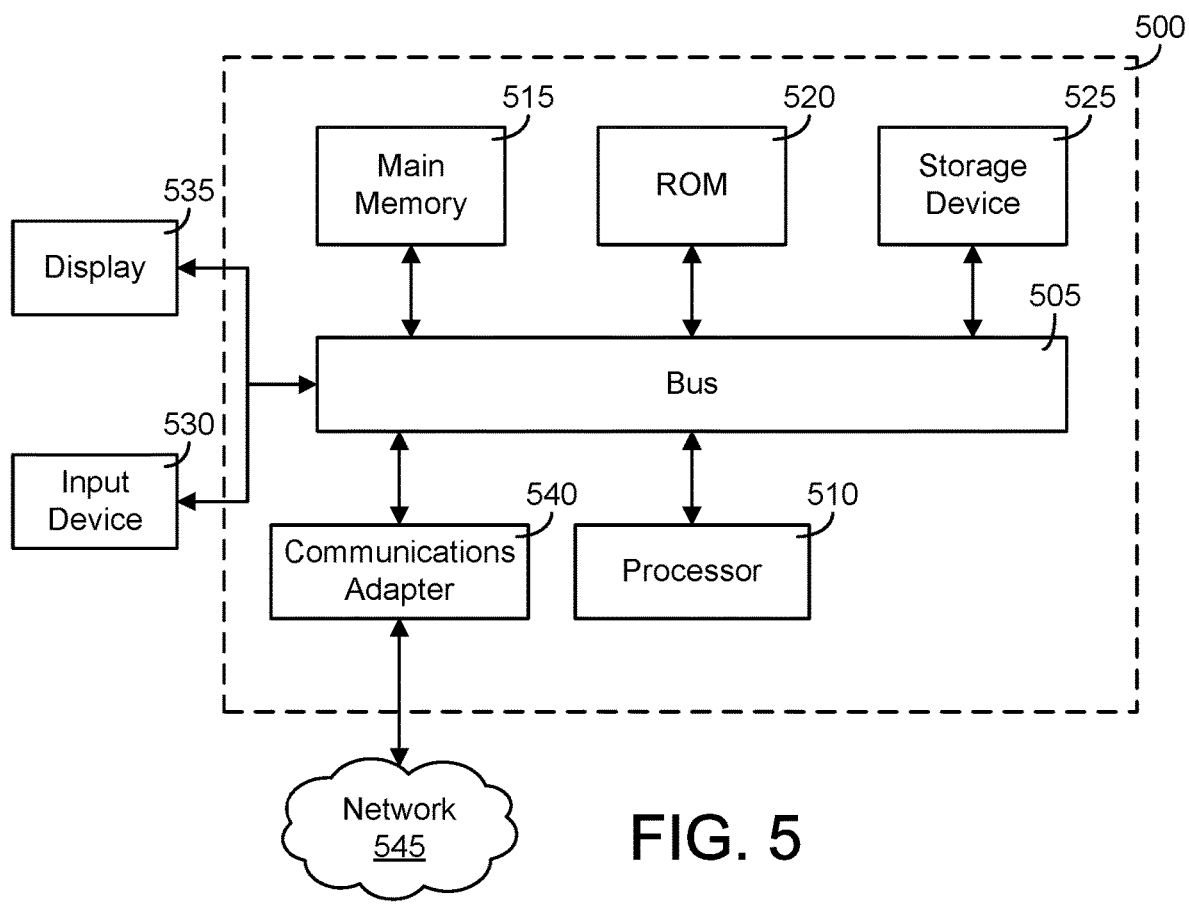
FIG. 5 is a block diagram of a computing system according to an illustrative implementation.

FIG. 5 illustrates a depiction of a computer system 500 that can be used, for example, to implement an illustrative user device 104, an illustrative content management system 108, an illustrative content provider device 106, an illustrative analytics system 150, and/or various other illustrative systems described in the present disclosure. Computing system 500 includes a bus 505 or other communication component for communicating information and a processor 510 coupled to bus 505 for processing information. Computing system 500 also includes main memory 515, such as a random access memory (RAM) or other dynamic storage device, coupled to bus 505 for storing information, and instructions to be executed by processor 510. Main memory 515 can also be used for storing position information, temporary variables, or other intermediate information during execution of instructions by processor 510. Computing system 500 may further include a read only memory (ROM) 520 or other static storage device coupled to bus 505 for storing static information and instructions for processor 510. A storage device 525, such as a solid state device, magnetic disk or optical disk, is coupled to bus 505 for persistently storing information and instructions.

Computing system 500 may be coupled via bus 505 to a display 535, such as a liquid crystal display, or active matrix display, for displaying information to a user. An input device 530, such as a keyboard including alphanumeric and other keys, may be coupled to bus 505 for communicating information, and command selections to processor 510. In another implementation, input device 530 has a touch screen display 535. Input device 530 can include a cursor control, such as a mouse, a trackball, or cursor direction keys, for communicating direction information and command selections to processor 510 and for controlling cursor movement on display 535.

In some implementations, computing system 500 may include a communications adapter 540, such as a networking adapter. Communications adapter 540 may be coupled to bus 505 and may be configured to enable communications with a computing or communications network 545 and/or other computing systems. In various illustrative implementations, any type of networking configuration may be achieved using communications adapter 540, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 500 in response to processor 510 executing an arrangement of instructions contained in main memory 515. Such instructions can be read into main memory 515 from another computer-readable medium, such as storage device 525. Execution of the arrangement of instructions contained in main memory 515 causes computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

The analytics system as described in the present disclosure may be implementable for any type of third-party content item. In one implementation, the content items may include advertisements. In one implementation, the content items may include any text, images, video, stories (e.g., news stories), social media content, links, or any other type of content provided by a third-party for display on the webpage of a first-party content provider. The type of content item for which the analytics system may be used is not limiting.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus" or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system of store device setup in physical locations, comprising:
   a client device comprising a store data application, device identification module, and a store visit data module executed by one or more processors, the store data application to:
   receive, without communication sent from the client device to one or more store devices, a plurality of signals pushed to the client device from the one or more store devices located in one or more physical storefronts, the plurality of signals each including a store identifier identifying the one or more physical storefronts;
   generate store visit data in response to receiving the plurality of signals, the store visit data comprising the store identifier of each of the plurality of signals, time data representing times associated with visits to the one or more physical storefronts and device activity, wherein the store visit data indicates a presence of the client device in the one or more physical storefronts;
   aggregate the store visit data for the plurality of signals pushed to the client device by the one or more store devices to generate aggregated store visit data; and
   transmit, without transmitting any store visit data from the client device to the one or more store devices, the aggregated store visit data to a server remote from the client device and the one or more store devices to cause the server to select a content item based at least in part on the aggregated store visit data, and provide the content item for presentation via the client device.

2. The system of claim 1, comprising the client device to:
   determine that the aggregated store visit data includes at least a threshold number of store identifiers; and
   in response to the determination that the aggregated store visit data includes at least the threshold number of store identifiers pushed to the client device by the one or more store devices, transmit the aggregated store visit data to the server.

3. The system of claim 1, wherein the server is further configured to:
   combine the aggregated store visit data with additional store visit data from a plurality of other client devices to generate combined store visit data; and
   select the content item based on the combined store visit data.

4. The system of claim 1, comprising the client device to:
   determine the device activity associated with the client device located at the one or more physical storefronts; and
   generate the store visit data indicating the device activity associated with the one or more physical storefronts.

5. The system of claim 1, comprising the client device to:
   determine user activity associated with the client device located at the one or more physical storefronts; and
   generate the store visit data indicating the user activity.

6. The system of claim 1, wherein the client device comprises a digital assistant.

7. The system of claim 1, comprising:
the client device to receive input comprising acoustic input.

8. The system of claim 1, comprising:
the client device to receive input comprising speech input.

9. The system of claim 1, comprising:
the client device to generate the store visit data indicating the device activity, the device activity associated with input received by the client device.

10. The system of claim 1, comprising the client device to:
remove at least a portion of the time data from the aggregated store visit data corresponding to specific times associated with visits to the one or more physical storefronts; and
replace the at least the portion of the time data removed from the aggregated store visit data with at least one of a date, a day of a week, or a week associated with the visits.

11. A method of store device setup in physical locations, comprising:
receiving, by a store data application of a client device comprising one or more processors, without communication sent from the client device to one or more store devices, a plurality of signals pushed to the client device from the one or more store devices located in one or more physical storefronts, the plurality of signals each including a store identifier identifying the one or more physical storefronts;
generating, by the store data application, store visit data in response to receiving the plurality of signals, the store visit data comprising the store identifier of each of the plurality of signals, time data representing times associated with visits to the one or more physical storefronts and device activity, wherein the store visit data indicates a presence of the client device in the one or more physical storefronts;
aggregating, by the store data application, the store visit data for the plurality of signals pushed to the client device by the one or more store devices to generate aggregated store visit data;
transmitting, by the store data application, without transmitting any store visit data from the client device to the one or more store devices, the aggregated store visit data to a server remote from the client device and the one or more store devices to cause the server to select a content item based at least in part on the aggregated store visit data, and provide the content item for presentation via the client device.

12. The method of claim 11, comprising:
determining that the aggregated store visit data includes at least a threshold number of store identifiers; and
in response to the determination that the aggregated store visit data includes at least the threshold number of store identifiers pushed to the client device by the one or more store devices, transmitting the aggregated store visit data to the server.

13. The method of claim 11, wherein the server is further configured to:
combine the aggregated store visit data with additional store visit data from a plurality of other client devices to generate combined store visit data; and
select the content item based on the combined store visit data.

14. The method of claim 11, comprising:
determining the device activity associated with the client device located at the one or more physical storefronts; and
generating the store visit data indicating the device activity associated with the one or more physical storefronts.

15. The method of claim 11, comprising:
determining user activity associated with the client device located at the one or more physical storefronts; and
generating the store visit data indicating the user activity.

16. The method of claim 11, wherein the client device comprises a digital assistant.

17. The method of claim 11, comprising:
receiving, by the client device, input comprising acoustic input.

18. The method of claim 11, comprising:
receiving, by the client device, input comprising speech input.

19. The method of claim 11, comprising:
generating, by the client device, the store visit data indicating the device activity, the device activity associated with input received by the client device.

20. The method of claim 11, comprising:
removing at least a portion of the time data from the aggregated store visit data corresponding to specific times associated with visits to the one or more physical storefronts; and
replacing the at least the portion of the time data removed from the aggregated store visit data with at least one of a date, a day of a week, or a week associated with the visits.

* * * * *